United States Patent
Qin et al.

(10) Patent No.: US 10,787,129 B2
(45) Date of Patent: Sep. 29, 2020

(54) OPERATING SYSTEMS FOR A VEHICLE STORAGE DEVICE

(71) Applicant: Ford Global Technologies LLC, Dearborn, MI (US)

(72) Inventors: Kylin Qin, Nanjing (CN); Mark Xue, Nanjing (CN); Cary Jia, Nanjing (CN); Kevin Liu, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 16 days.

(21) Appl. No.: 16/049,494

(22) Filed: Jul. 30, 2018

(65) Prior Publication Data

US 2019/0077323 A1    Mar. 14, 2019

(30) Foreign Application Priority Data

Sep. 14, 2017   (CN) .......................... 2017 1 0827243

(51) Int. Cl.
  B60R 7/04       (2006.01)
  B60R 16/037   (2006.01)
  (Continued)

(52) U.S. Cl.
  CPC .................. B60R 7/04 (2013.01); B60N 3/10 (2013.01); B60R 16/0373 (2013.01);
  (Continued)

(58) Field of Classification Search
  USPC .......................................................... 701/49
  See application file for complete search history.

(56) References Cited

U.S. PATENT DOCUMENTS 5,375,805 A    12/1994  Sudak et al.
7,164,117 B2 *  1/2007  Breed ............... B60R 21/01516
                                                              250/208.1
(Continued)

FOREIGN PATENT DOCUMENTS

DE        10027373 B4    3/2009
DE    102011008586 64    9/2013
(Continued)

OTHER PUBLICATIONS

Google Translation of over Japanese Patent Application Pub. No. JP 2008-247090 A 1 to Yasuhiro et al. that published in 2008 (hereinafter "Yasuhiro") (Sep. 19, 2019).*

(Continued)

*Primary Examiner* — Jean Paul Cass
(74) *Attorney, Agent, or Firm* — David Coppiellie; Kolitch Romano LLP

(57) ABSTRACT

An operating system for moving an item stored in a vehicle storage device is provided. The storage device includes a first storage container and a second storage container disposed in the storage device. The operating system comprises a first operating device connected to the first storage container; a second operating device connected to the second storage container; a user intention detecting device for detecting an intention of a user to take an item; and a controller. The controller is configured to receive an intention signal from the user intention detecting device and control one of the first and second operating devices based on the intention signal obtained to move the first or second storage containers to a use position which is easier for the user to take the item.

14 Claims, 7 Drawing Sheets

(51) Int. Cl.
  *B60W 50/00* (2006.01)
  *B60W 50/12* (2012.01)
  *B60N 3/10* (2006.01)

(52) U.S. Cl.
  CPC ........ *B60W 50/0098* (2013.01); *B60W 50/12* (2013.01); *B60W 2520/10* (2013.01); *B60W 2540/18* (2013.01); *B60W 2540/21* (2020.02); *B60W 2540/22* (2013.01); *B60W 2554/801* (2020.02)

(56) References Cited

U.S. PATENT DOCUMENTS

| | | | | |
|---|---|---|---|---|
| 7,794,000 | B2* | 9/2010 | Ichimaru | B60R 7/04 248/311.2 |
| 8,033,588 | B2* | 10/2011 | Luginbill | B60R 7/04 296/24.34 |
| 8,573,668 | B2* | 11/2013 | Miklas | B60N 3/10 248/311.2 |
| 8,579,348 | B1* | 11/2013 | Myers | B60R 7/04 296/24.34 |
| 8,894,120 | B2* | 11/2014 | Lechkun | B60N 3/00 296/24.34 |
| 9,085,265 | B2* | 7/2015 | Hipshier | B29C 44/086 |
| 2005/0216126 | A1* | 9/2005 | Koselka | B25J 9/0003 700/259 |
| 2006/0282204 | A1* | 12/2006 | Breed | G01G 23/3728 701/49 |
| 2007/0114847 | A1 | 5/2007 | Ichimaru et al. | |
| 2016/0135706 | A1* | 5/2016 | Sullivan | A61B 5/1118 600/301 |
| 2017/0285646 | A1* | 10/2017 | Connor | B60W 10/184 |
| 2019/0184926 | A1* | 6/2019 | Jang | B60W 50/0098 |
| 2019/0302258 | A1* | 10/2019 | Lee | G01S 7/526 |

FOREIGN PATENT DOCUMENTS

| | | |
|---|---|---|
| DE | 102014113860 A1 | 3/2016 |
| JP | 2008247090 A * | 10/2008 |

OTHER PUBLICATIONS

Sync 3 Voice Commands https://owner.ford.com/how-tos/sync-technology/sync-3/setup/sync-3-voice-commands.html.
Introducing Sync 3 https://www.ford.com/technology/sync/.

* cited by examiner

OPERATING SYSTEMS FOR A VEHICLE STORAGE DEVICE

RELATED APPLICATION

This application claims the benefit of Chinese Patent Application No.: CN201710827243.6, filed Sep. 14, 2017, the entire contents thereof being incorporated herein by reference.

FIELD

The present disclosure generally relates to an operating system to move objects in a vehicle storage device, more particularly relates to a system of automatically moving a vehicle storage device according to a user demand.

BACKGROUND

A center console in a vehicle normally includes storage compartment to hold items such as electronic devices, purses and cup holders. When a user needs a cup or an item, he or she may have to turn around to look for it, which is not convenient during driving.

US20070114847 discloses a moving device which moves a movable member between a usable position and a non-usable position. The moving device includes a driving device attached to the moveable member for moving the same, a sensor for detecting a movement of an occupant, and a control device electrically connected to the driving device and the sensor for operating the driving device to move the movable member between the usable position and the non-usable position based on a signal from the sensor. However, the moving device moves the movable member rather than the stored items.

The inventors of the present disclosure have realized that there exists a need for an operating system which can lift the items in the compartment for easy grabbing by a user.

SUMMARY

According to one aspect of the present disclosure, an operating system in a vehicle storage device is provided. The storage device may include a first storage container and a second storage container. The operating system may comprise: a first operating device connected to the first storage container; a second operating device connected to the second storage container; a user intent detecting device to detect an intent of a user to take an item from one of the first and second storage containers; and a controller. The controller is configured to receive an intent signal from the user intent detecting device and control one of the first and second operating devices based on the intent signal to move the first or second storage container to a use position that is easier for the user to take the item compared to a stowed position.

In one embodiment of the present disclosure, the user intent detecting device may include a speech recognition device configured to obtain and recognize instruction from the user to take an item from the first or second container, and the user position may be a position where the first storage container or the second storage container is at a height higher than a stowed position.

In another embodiment of the present disclosure, the operating system may further comprise a position detecting device. The controller may be further configured to receive a signal from the position detecting device and to determine a relative position of a hand or an arm of the user to the first or second storage container, and determine the use position based on the relative position of the hand or the arm of the user to the first or second storage container.

In another embodiment, the position detecting device may include one of a position sensor and a camera.

In another embodiment, each of the first and second operating device may include a retractable assembly and a driving device connected to the retractable assembly, and the retractable assembly is able to extend and retract and configured to move the first and second storage containers along a vehicle height direction.

In another embodiment, the operating system may further comprise a speed sensor and a steering sensor. The controller may be further configured to receive a speed signal from the speed sensor and a steering signal the steering sensor. The first and second operating devices may be restricted from operation when the speed signal and the steering signal indicate that it is not safe to operate the steering wheel with one hand off a steering wheel.

In another embodiment, the operating system may further comprise a vehicle distance sensor to obtain information on a distance from the vehicle to another vehicle. The controller may be configured to control the operation of the operating devices based on the distance and restrict movement of the first and second operating devices when the distance is smaller than a threshold.

In another embodiment, the vehicle user intent detecting device may comprise a proximity sensor. The proximity sensor may be configured to obtain a signal when a user hand approaches or contacts the first or second storage container and determine that the user intends to take the item based on the signal.

According to another aspect of the present disclosure, an operating method for a storage device of a vehicle is provided. The storage device may include a first storage and a second storage container, a first operating device connected to the first storage container, and a second operating device connected to the second storage container. The method may comprise: detecting an intent of a user to take an item from the storage device; moving the first or the second operating device to place the first or the second container to a use position at which it is easy for the user to take the item compared to a stowed position when it is determined that the user intends to take the item.

In one embodiment, detecting the intent of the user may include receiving a voice command from a speech recognition device.

In another embodiment, the operating method may further comprise detecting a relative position of a hand or an arm of the user to the first or second storage container, and determining the use position based on the relative position.

In another embodiment, the relative position of the hand or the arm of the user to the first or second storage container may be determined based on a signal from one of a position sensor and a camera, and the user position is a position higher than the stowed position.

In another embodiment, the method may further comprise modifying the use position based on a relative position of an arm or a hand of the user relative to the first storage container or a second storage container.

In another embodiment, the method may further comprise detecting a vehicle speed, a steering status and a distance between the vehicle and another vehicle and controlling the first or the second operating device based on information on the vehicle speed, the steering status and the distance.

In another embodiment, the method may further comprise returning the first or second storage container to the stowed position after the item is placed back in the first or second storage container.

In another embodiment, returning the first or second storage container to the stowed position may be performed based on a voice command of the speech recognition device.

In another embodiment, each of the first and second storage container may include a weight sensor, and the method may further comprise: returning the first or second container to the stowed position upon detection of an increased weight in the first or second storage container after completion of moving the first or the second storage container to the use position.

According to yet another aspect of the present disclosure, an operating system in a vehicle is provided. The operating system may comprise a first storage container; a second storage container; a speech recognition device to detect an intent of a user to take an item from the first or second storage containers; a first operating device and a second operating device drivably connected to the first and second storage container, respectively; and a controller configured to determine an intent of a user based on a signal from the speech recognition device and control one of the first and second operating devices to selectively raise one of the first and second storage container to a user position closer to a user than a stowed position.

In another embodiment, the operating system may further comprise a position sensor or a camera to obtain information on a position of an arm or a hand of the user relative to the first or second storage containers, wherein the controller is configured to receive the information on the position of the arm or the hand of the user and determine the use position for the first and second operating device based on the obtained information.

In another embodiment, the controller may be further configured to receive information related to a safe driving and control the first or second operating device based on the information related to the safe driving, and wherein while a safety measure is activated, the first or second operating device is returned to or retained at the stowed position when the information related to the safe driving indicates that it is not safe to operate the first and second operation devices.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

Figure 1:
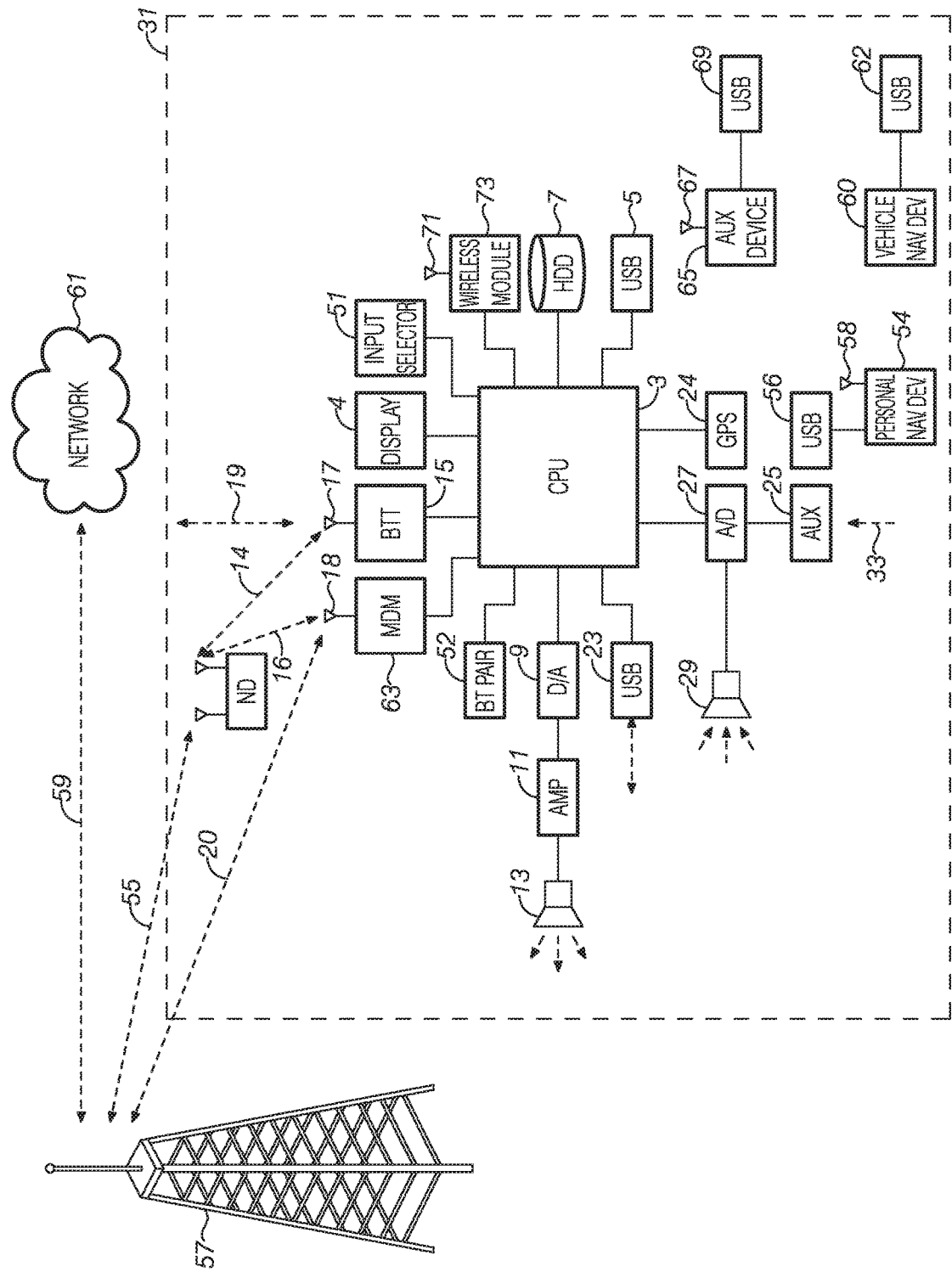
FIG. 1 illustrates an example block topology for a vehicle based computing system.

It should be noted that these figures are intended to illustrate the general characteristics of methods, structures and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF ONE OR MORE EMBODIMENTS

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

As discussed in the background, vehicles generally have a storage container and cup holders. During driving, a user may find it inconvenient to use a cup or take an item as he or she may need to lower his or her head or turn around. To provide convenience, some existing proposal as mentioned provided a container with a movable cover upon sensing a hand movement. While the inventors of the present disclosure realized that there still exists a need to provide a more convenient operating device and operating method.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Additionally or alternatively, for example, WiFi (IEEE 802.11) transceiver 71 is coupled to the CPU of the vehicle based wireless router. This may allow the CPU to connect to remote networks in range of the local router 73. Auxiliary device 65 may include, but are not limited to, personal media players, wireless health devices, portable computers, and the like.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM). Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10. Additionally, the controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Figure 2:
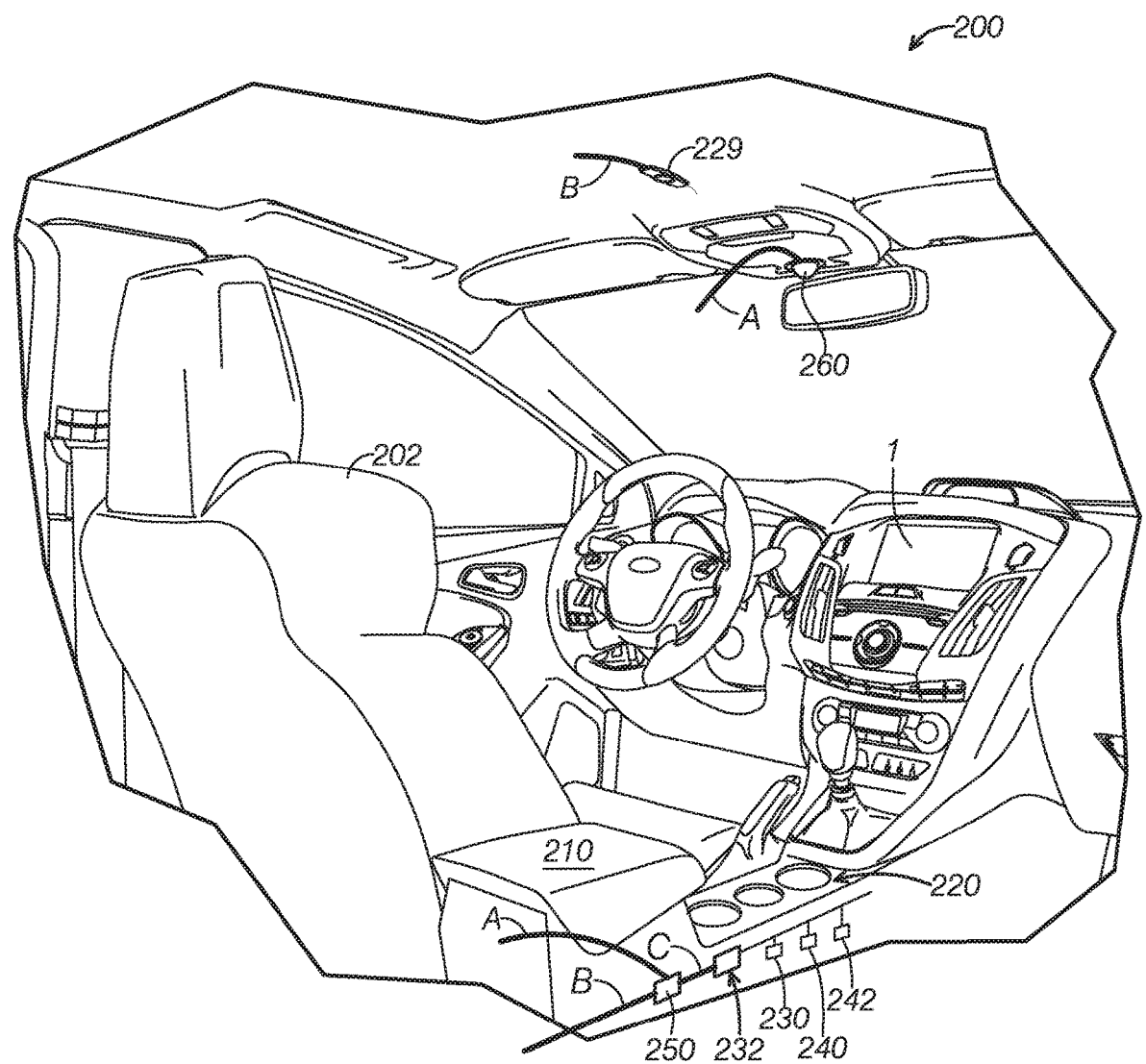
FIG. 2 illustrates a part of vehicle interior and an operating system of a vehicle storage device according to one or more embodiments of the present disclosure.

FIG. 2 illustrates a center console and an operating system 200 according to one or more embodiments of the present disclosure. As shown in FIG. 2, in one embodiment, a center console of a vehicle may include a storage compartment 210 and a plurality of cup holders 220 between the driver seat 202 and passenger seat (not shown). The storage compartment 210 may include a container lid 212. The storage compartment 210 is shown as one container, it will be appreciated that the storage compartment 210 may be formed as two or more separated containers and each container may have its own lid. As mentioned herein or elsewhere, the cup holder and the storage compartment may be generally referred to as storage devices. In one embodiment, the operating system 200 includes a first operating device 230 and a second operating device 240 each drivably connected to the storage compartment 210 and cup holder 220, respectively. FIG. 2 illustrates the first or second operating device 230, 240 are connected to and driven by a driving device 232 (e.g., a motor). The operating device 230, 240 may be further electrically connected to a controller 250.

Continuing FIG. 2 and with further reference to FIG. 1, in one or more examples, the operating system 200 further includes a speech recognition device (not shown) to detect an intent of a user to take an item from the storage device for instance the storage compartment 210 and the cup holder 220. The speech recognition device may include an input device, for example a microphone and a processor and a converter. In an example, an input to the microphone is converted from an analog signal to a digital signal before being transferred to the processor. In one example, the speech recognition device may be an independent device or in other words a separated device. In another example, the speech recognition device may be an embedded part of the sync system and VCS 1 as described in FIG. 1. The speech recognition device includes a microphone 229 located in a vehicle. In one example, the microphone 229 may be located in the vehicle interior. The controller 250 is configured to determine an intent of the user based on the input signal of the microphone 229 of the speech recognition device, and to control one of the first and second operating devices 230, 240 to selectively raise one of the cup holder 220 and the storage compartment 210 such that the user can easily take the item. In the depicted embodiment, the controller 250 is a separated device in the center console. It will be appreciated that, the controller 250 may be located at any appropriate position. For instance, the controller 250 may be integrated to the vehicle computer system VCS 1 illustrated in FIG. 1 and communicate with the first operating device 230 and the second operating device 240 or the operating system 200 in a wireless manner.

In some embodiments, the vehicle operating system 200 further comprises a camera 260 located in the vehicle interior, the camera 260 may be used to obtain images of the user and the vehicle interior such that a relative position of an arm or a hand of the user to the storage device may be determined. The camera 260 may function as a position determining device. The camera 260 is shown to be located on a ceiling of the vehicle interior. It will be appreciated that the camera 260 may be positioned at any other locations, including but not limit to a location near the vehicle instrument panel. In the depicted embodiment, the camera as a position determining device 260 may be connected to a controller 250 via a wire harness A. The microphone 229 as an input of the user intent detecting device is connected to the controller 250 via a wire harness B. The controller 250 is further connected to a driving device 232 such as the motor via a wire harness C, thereby driving the operating device 230 and 240. FIG. 2 illustratively depicts an exemplary layout of the devices of the operating system 200 and wire harness located at various locations of the vehicle. It will be appreciated that the controller 250 and the wire harness may be located in other locations. Alternatively, it will be appreciated that the different devices in the operating system 200 may be in wireless communication with the controller 250. For instance, the controller 250 may be in wireless communication with the camera 260, the microphone 229 or the driving device 232 and transmits data to or receive data from them via vehicle network (for instance but not limit to CAN bus).

It will be appreciated that the number of the operating devices may vary according to the number of cup holders and the storage compartments. In some embodiments, the center console and an operating system 200 may include a third operating device 242 for a third cup holder. Although illustrated embodiments are discussed in the context of the center console close to the driver, it will be appreciated that the embodiments of the present disclosure may be utilized in autonomous vehicles as well.

Figure 3:
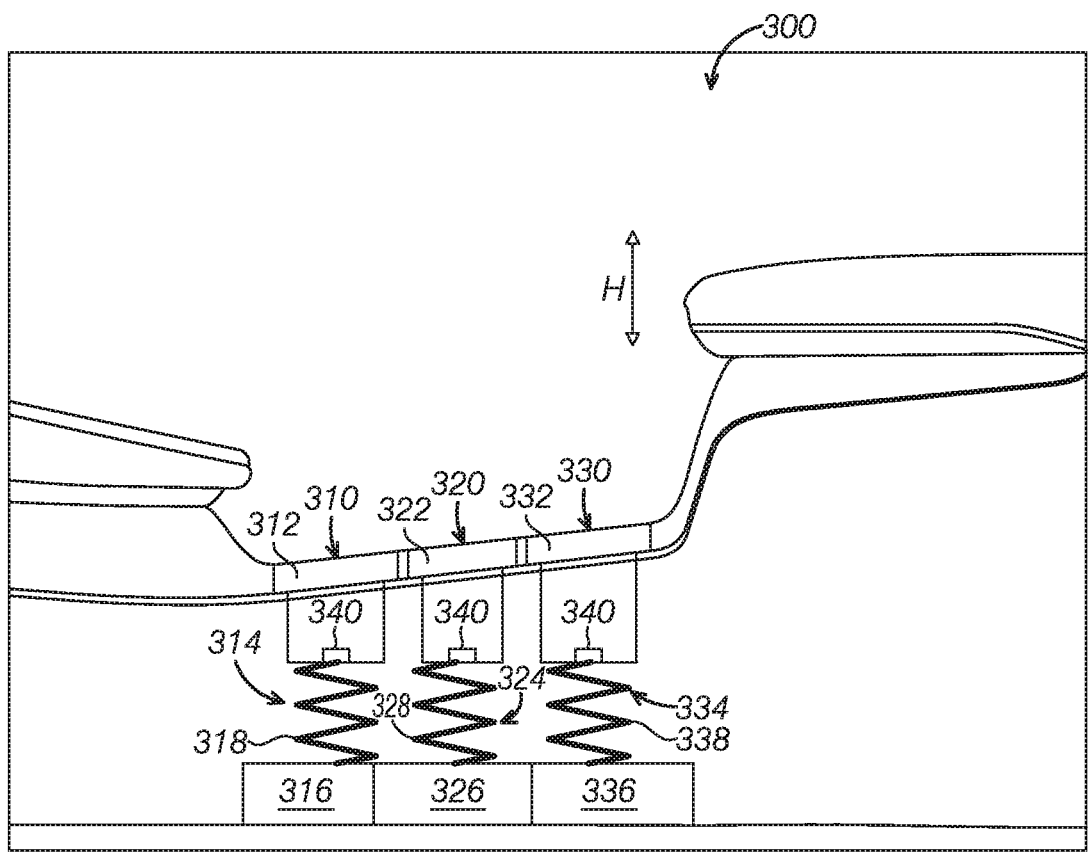
FIG. 3 illustrates a vehicle storage device according to one or more embodiments of the present disclosure.
Figure 4:
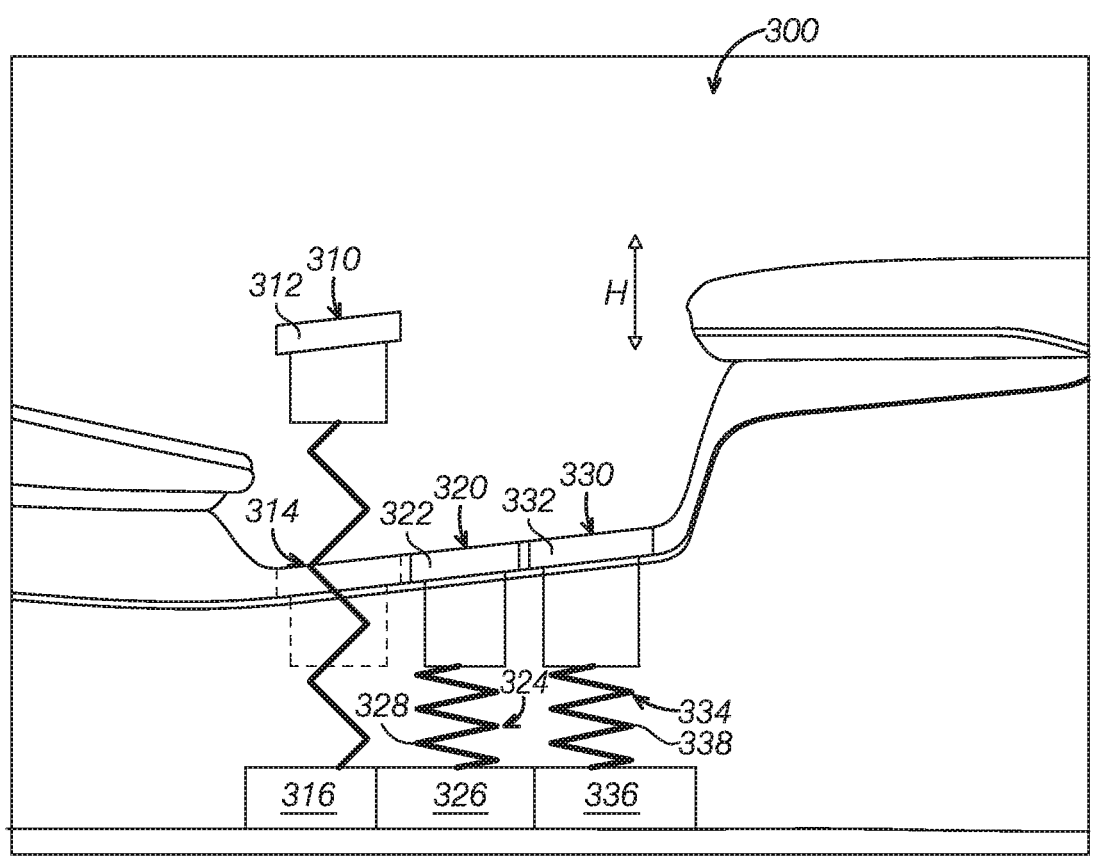
FIG. 4 illustrates a use status of the vehicle storage device in FIG. 3.

FIG. 3 illustrates a storage device 300 in a stowed position in one or more embodiments. FIG. 4 shows the storage device 300 in FIG. 3, illustrating the storage device 300 at a use position. In the depicted embodiment, the storage device 300 includes a first storage container 310, a second storage container 320 and a third storage device 330. The first storage device 310, the second storage device 320, the third storage device 330 includes a first lid 312, a second lid 322 and a third lid 332, respectively. It will be appreciated that each of the first storage container 310, the second storage container 320, and the third storage container 330 may include a lock respectively, for instance, an inertia lock known in the art. Further, the first storage container 310 may be connected to the first operating device 314; the second storage container 320 may be connected to the second operating device 324, and the third operating device 330 may be connected to the third operating device 334. The first, second, third storage containers 310, 320, 330 may be used to store different items. For instance, the first storage container 310 may be used to store a beverage can or a cup. In the circumstance that the first storage container 310 is a cup holder, a lid may be included. The second storage container 320 may be used to store electronic devices, and the third storage container 330 may be used to store other items such as a purse or coins. In the depicted embodiment, the first, second and third operating devices 314, 324, 334 are independent from each other and each drives the first, second and third storage containers 310, 320, 330, respectively. Referring to FIG. 2 through FIG. 4, in one example, the controller 250 of the vehicle may receive a speech signal from a user via the microphone 229 and triggers one of the first, second and third operating devices 314, 324, 334 to move and place one of the first, second and third operating devices 314, 324, 334 to the use position that is easy for a user to take the item. As shown in FIG. 4, the first storage container 310 is moved to the use position from the stowed position in FIG. 4.

In the embodiment shown in FIG. 3 and FIG. 4, the controller 250 may command the first, second and third operating devices 314, 324, and 334 to move via a wire harness C or WiFi or CAN bus. The first operating device 314 may include a first retractable assembly 318 and a first driving device 316 (for instance a motor) to drive the first retractable assembly 318. The second operating device 324 may include a second retractable assembly 328 and a second driving device 326 (for instance a motor) to drive the second retractable assembly 328. The third operating device 334 may include a third retractable assembly 338 and a third driving device 336 (for instance a motor) to drive the third retractable assembly 338. Specifically, the controller 250 may enable the first, second and third retractable assemblies 318, 328, and 338 extend or retract via the first, second and third driving devices 316, 326, 336, respectively. In another embodiment, the vehicle operating system may include a single driving device, the wiring is designed in such a manner that allows independent movement of the retractable lever assemblies. In some embodiments, the first, second and third retractable assemblies 318, 328, 338 are configured to move the first, second and third storage containers 310, 320, 330 along a height direction H of the vehicle, respectively. In the depicted embodiment, each of the retractable assembly 318, 328, 338 may be a retractable lever assembly and configured to include a zigzag lever which may be deployed to a longer length to raise the storage container to a use position and compressed to a shorter length to a stowed position. In another embodiment, the retractable assembly may be a set of hollow tubes that are connected slidably to each other, and a longer or shorter length in the height direction H may be achieved when an extent of overlapping of the hollow tubes varies via sliding. In other embodiments, the retractable assembly maybe a gear and rack assembly and a longer or a shorter length in the height direction can be achieved by the relative movement between the gear and a rack. It will be appreciated that the retractable assembly may be any suitable devices known in the art that enables extending and retracting at one direction.

Figure 5:
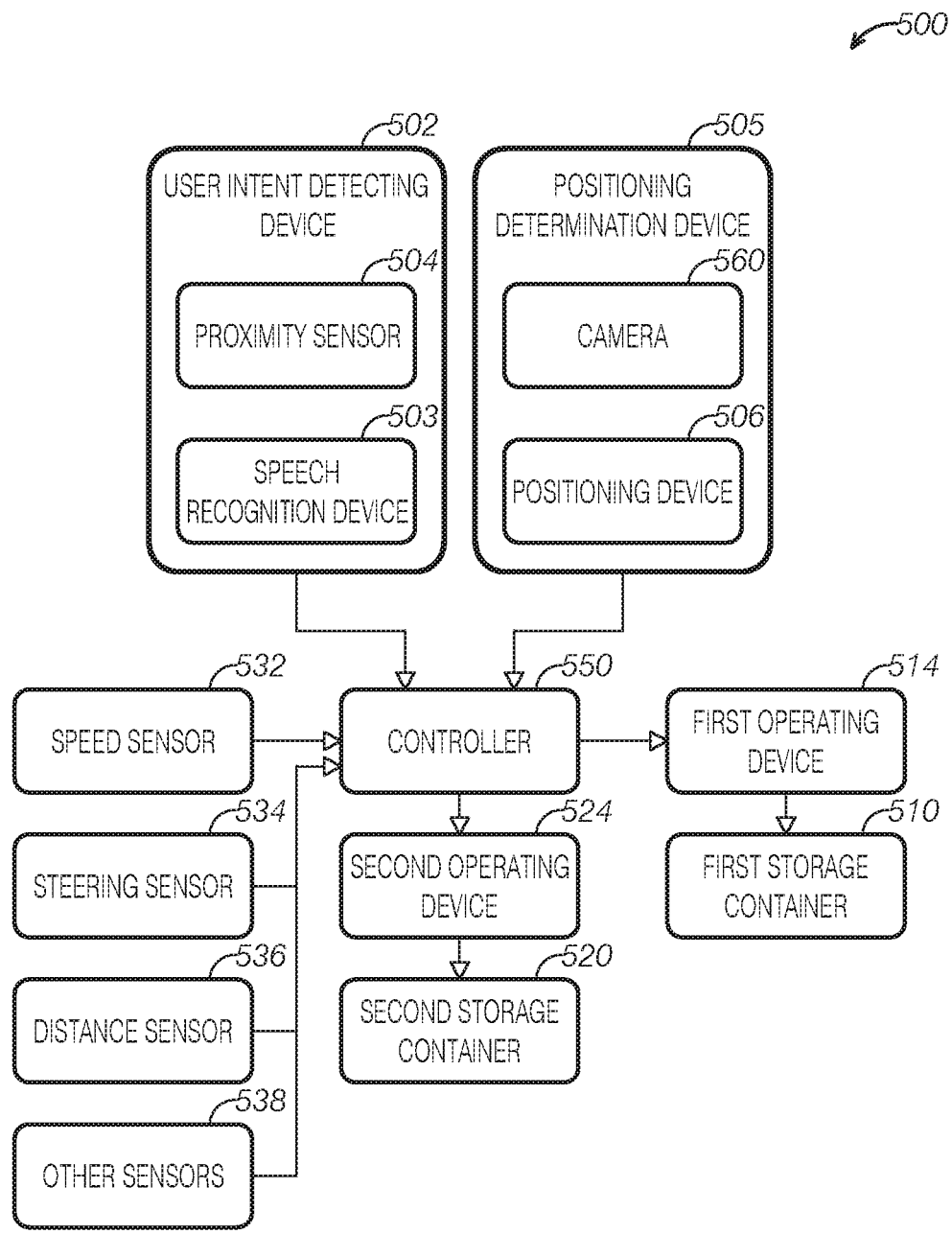
FIG. 5 illustrates a block diagram of the operating system of the vehicle storage device according to one or more embodiments of the present disclosure.

FIG. 5 is a schematic block diagram of an operating system 500 to move vehicle storage containers according to one embodiment of the present disclosure. For the sake of brevity, two storage containers are discussed as an example. It will be appreciated that one storage container or more than two storage containers may be provided in the operating system. The storage devices may include a first storage container 510 (e.g., a cup holder), a second storage container 520 (e.g., a storage compartment to store items other than the cup or beverage can). The operating system 500 includes a first operating device 514 connected to the first storage container 510, a second operating device 524 connected to the second storage container 520; a user intent detecting device 502 to detect a user intent to take an item from a storage container; and a controller 550. The controller 550 is configured to receive a signal from the user intent detecting device 502 and control the operating device 514 or 524 to move the storage container 510 or 520 to a use position that is easy for a user to take an item compared to a stowed position. In some embodiments, the use position may be closer to the user or a position higher than the stowed position. The controller 550 may be a controller described with reference to FIG. 1 through FIG. 4. The first operating device 514 and the second operating device 524 may be the operating devices described with reference to FIG. 2 and FIG. 3 or any other appropriate devices that is able to move or translate the storage containers from the stowed position to the user position.

In one embodiment, the user intent detecting device 502 may be a speech recognition device 503. The speech recognition device 503 may be an independent device, or it may be a part of the vehicle computer system. The controller 550 determines if the user intends to take an item from the first storage container 510 or the second storage container 520. In another embodiment, the user intent detecting device 502 may be a proximity sensor 504. When a user reaches his or her hand toward or touches the first storage container 510 or the second storage container 520, the controller 550 determines that the user intends to take the item from the first storage container 510 or the second storage container 520.

Continuing with FIG. 5, the operating system 500 may further include a position determination device 505 to determine a relative position between a hand/an arm of the user and the storage container 310 or 320. In one embodiment, the position determination device 505 may include a camera located at a vehicle interior such as at a vehicle ceiling, an instrument panel area or any other suitable locations. The location of the camera or the angle of the view may be designed such that an image of an arm or a hand around of the storage container may be captured. In other embodiments, the position determination device 505 may include a positioning device 506. For instance, the positioning device may be a Hall Effect sensor or a radar to determine a relative position of a hand or an arm to the storage container. The operating system 500 may be further configured to adjust or modify the use position based on the relative position. In other words, the use position of the storage containers can be adaptively adjusted or raised based on the relative position of the arm and hand to the storage container. For example, the adjusted use position may be higher than the previous use position when the relative position between the hand or the arm to the storage container is larger. The adjusted use position makes it possible to suit for the users with different sizes or height.

In one embodiment, the operating system 500 further includes a speed sensor 532 to detect a vehicle speed, a steering sensor 534 to detect a steering action, a distance sensor 536 to detect a distance between the vehicle and another vehicle, and other sensing devices 538. The controller 550 is configured to receive signals such a speed signal, a steering signal and a distance signal from one or more sensors 532, 534, 536, 538. In one or more examples, other sensors 538 may be but not limited to cameras to detect road signs, or GPS devices to guide the operation of the operating devices 514, 524. For example, when the signals indicate that the vehicle is driving in a school zone, a wild animal appearing area, near sidewalk, a narrow road, a slippery road, the movement of the storage container may be controlled differently from a normal driving or the movement is restricted or prohibited. For example, when a potential risk of collision may occur, or passive restriction means is activated, the automatic operation of the storage container is prohibited. In some embodiments, the operation of the operating system 500 may be configured to meet legislations on the safe driving. If the legislation has a restriction on using electronic devices during driving, automatic operation may not be configured for a storage container designed for the electronic devices such as smart phone holder. In some embodiments, the operating system may be configured to restrict or prohibit the movement of the storage devices based on one or more information related to driving. The information related to driving may include but not limited to a vehicle speed, a road condition, a steering status, and a position of the vehicle. In some embodiments, the operating system may control the storage devices to be lowered to a stowed position when the information indicates that it is not safe for the storage device located at a raised position. In some embodiments, the operation system may be configured to alert the user when there is a need to prohibit the movement of the storage devices.

Figure 6:
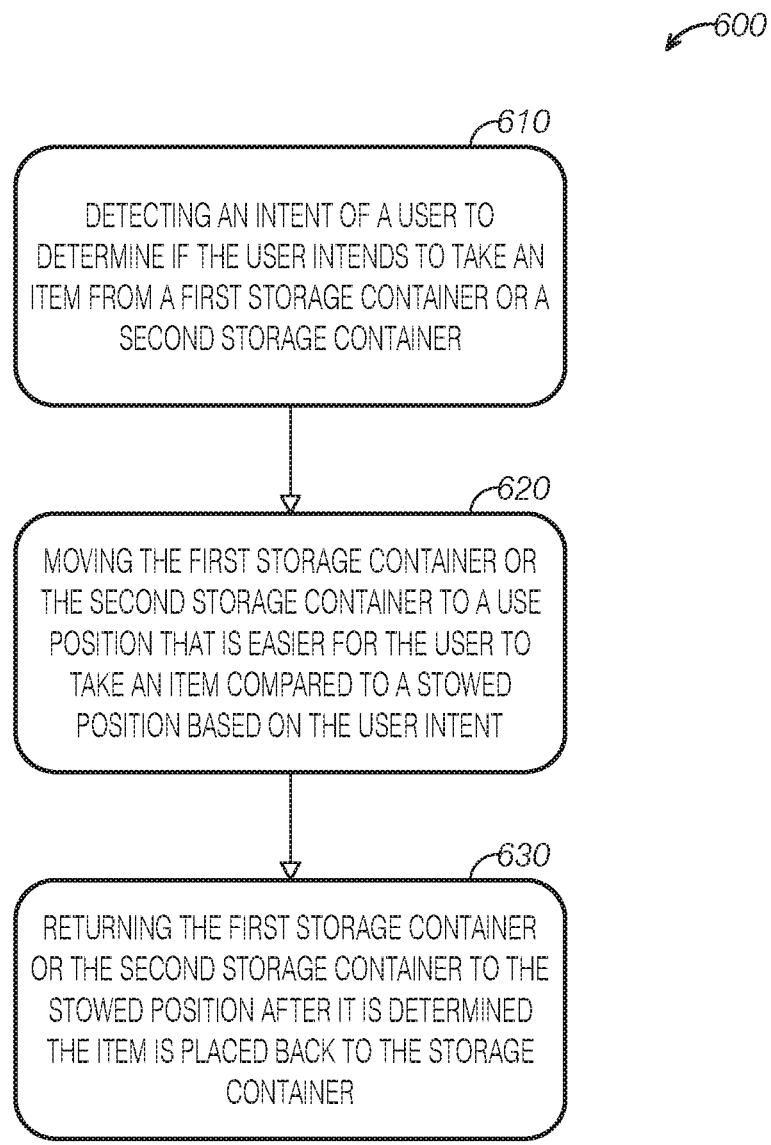
FIG. 6 illustrates an operating flow of the vehicle storage device according to one or more embodiment of the present disclosure.

FIG. 6 is a flowchart of method 100 to operate according to one embodiment of the present invention. Referring to FIG. 6 and with further reference to FIG. 2 through FIG. 5, the method 600 includes detecting an intent of a user to determine if the user intends to take an item from a first storage container or a second storage container at 610. In one embodiment, detecting the intent of the user may include receiving and recognizing a speech command from the user. For instance, when the user says "cup" or a phase indicating that he or she wants a cup in the first or second container, the speech recognition device recognizes it as a command to move the first storage container or the second storage container. The controller of the operation system may be stored with a tag that associates the cup with the first and second operating devices, and/or the first and second storage containers and determine that the "cup" is associated with the first storage container, for example. In another embodiment, detecting the intent of the user may include determining if a hand of the user is near the first storage container or the second storage container based on a signal from a proximity sensor. At 620, the method 600 may include moving the first storage container or the second storage container to a use position that is easier for the user to take an item compared to a stowed position based on the user intent. At 630, the method 600 may include returning the first storage container or the second storage container to the stowed position after it is determined the item is placed back to the storage container. For example, the first storage container 310 will be lowered from use position to the stowed position once the item is placed back to the storage container. In an embodiment, a weight sensor 340 may be disposed in the first and second storage containers 310, 320. The method may include returning the first or the second storage container 310, 320 to the stowed position once an increased weight of the first or the second storage container 310, 320 is detected after the item in the first or the second storage container 310, 320 is taken by the user. In another embodiment, a lapsed time since the item is taken may be used as a criterion to start performing the step 630. The lapsed time may be the time that the user has finished using the item and put it back to the storage container. For instance, the storage container may be moved to the stowed position when the lapsed time reaches 30 seconds. It will be appreciated that other parameters and information such as a voice command may be used to determine when the raised storage container will be returned to the stowed position.

Figure 7:
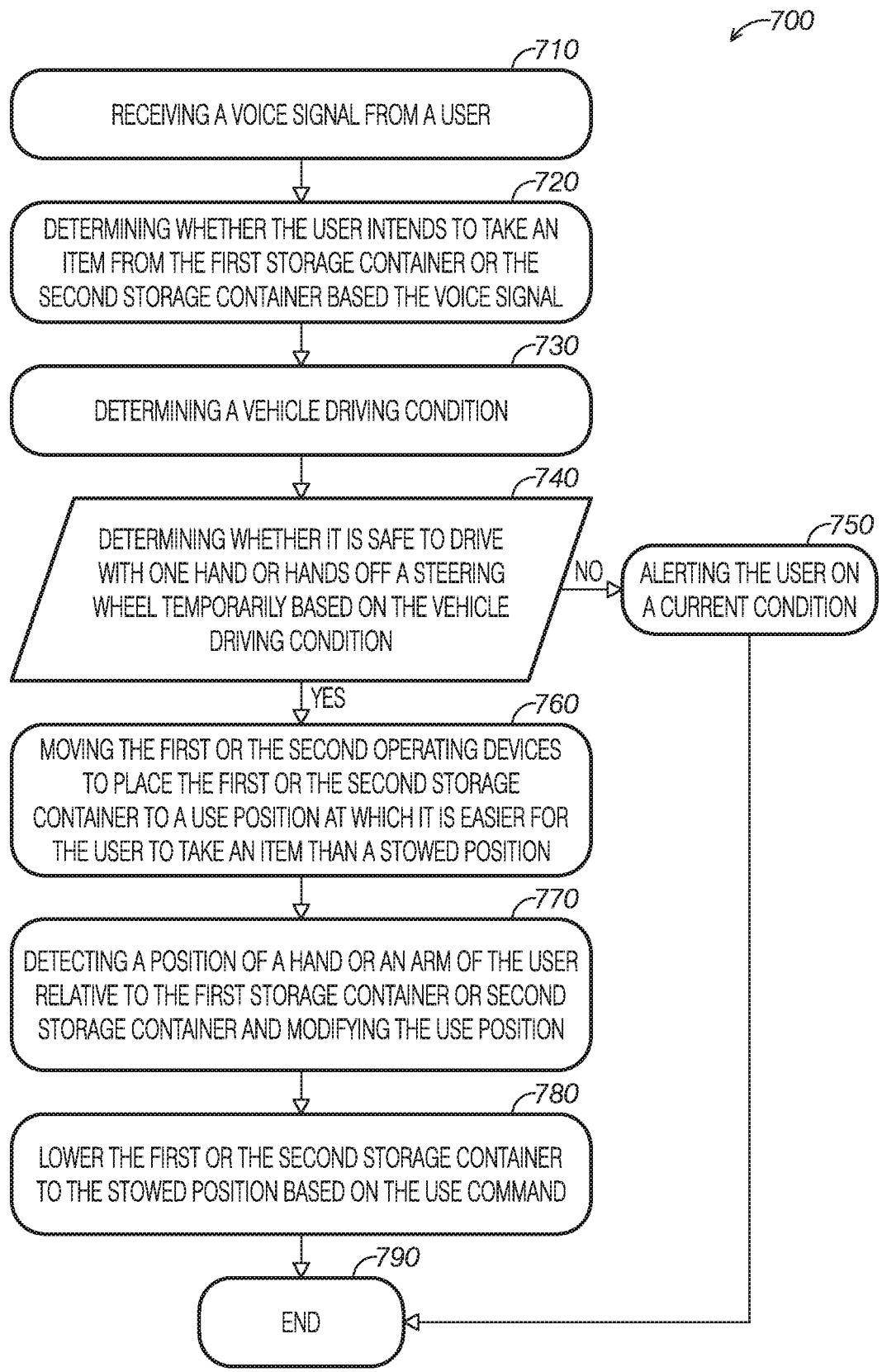
FIG. 7 illustrates an operating flow of the vehicle storage device according to another embodiment of the present disclosure.

FIG. 7 is a flow chart of a method 700 of operating storage containers in a vehicle. The method 700 will be described with the reference to FIGS. 1-5. The devices in the operating system 500 in FIG. 5 will be referred to in the description of method 700. It will be appreciated that some devices described may be the devices illustrated in FIGS. 1-4 such as the first and second storage containers 320, 330 and the first and second operating devices 324 and 334. At 710, the method 700 may include receiving a voice signal from a user. In one embodiment, the voice signal is a voice command sent by the user via a microphone 229 in the vehicle, and the voice command may be transmitted to a controller or the vehicle computer system to be recognized. At 720, the method may include determining whether the user intends to take an item from the first storage container 510 or the second storage container 520 based on the voice signal. For example, if the user says "cup" or a phrase indicating a need for the cup, the method 700 may determine that the user wants the cup in the first storage container 510. In another example, if the user says "phone" or a phrase indicating a need for a phone, the method 700 may determine that the user wants the phone in the second storage container 520. If the user says "GPS" or "Music", the method 700 may determine that he or she has no intent to take an item from the storage containers. It could be appreciated that the triggering words "cup" or "phone" may be other words, and it could be used in conjunction of other means too, for instance with other first level triggering words, like "storage container" and "cup" to avoid unintentional triggering events.

Next, at 730, the method may include determining a vehicle driving condition. The vehicle driving condition may be determined by one or more sensing devices such as the speed sensor 530, steering sensor 540, vehicle distance sensor 550, and/or other sensors 560. The sensors may be used to obtain information on the speed, whether to make a turn or change lane, the distance between the vehicle and another vehicle, and other information related to the vehicle safe driving. At 740, the method 700 may include determining whether it is safe to drive with one hand or hands off a steering wheel temporarily based on the vehicle driving condition. In one example, when the vehicle is driving at a high speed or is making a turn, it can be determined that it is not safe to drive with one hand or both hands off the steering wheel and the movement of the first operating device 514 and the second operating device 524 will be restricted or the operation of the first operating device 514 and the and second operating devices 524 will be prohibited. In another embodiment, the controller 550 may restrict the operation of the first and second operating devices based on the information that a distance of the vehicle from other vehicles is smaller than a threshold as such that the condition is not suitable for a driver's hand off the steering wheel or the condition is not suitable to raise the storage container. In another embodiment, information on multiple parameters may be used to determine the operation of the operating system. For example, if the vehicle speed is high but active cruise control (ACC) mode is on), it may be determined that it is acceptable to operate the steering wheel with one hand or both hands off. In another embodiment, if the vehicle distance is small but vehicle is moving slowly, it may be determined that movement of the storage container is acceptable. The step 740 may further take into consideration of other alerts, signs or requirements of legislations. If one or more parameter indicate that it is not allowed to operate with one or both hands off the steering wheel, at the step of 750, the method 700 may alert the user on the current condition. For example, a voice message may be issued and/or a test message may be displayed on a human machine interface of the vehicle to inform the user of the current conditions. The user may decide to wait to take the item.

Continuing referring to FIG. 2 through FIG. 7, at step 740, if one or more parameters indicate that it is appropriate to operate the storage container, the method proceeds to step 760. At 760, the method 700 may include moving the first or the second operating devices 514, 524 to place the first or the second storage container 510, 520 to a use position at which it is easier for the user to take an item compared to a stowed position. At step 770, the method 700 may include detecting a position of a hand or an arm of the user relative to the first storage container 510 and second storage container 520 to modify the user position. For instance, the controller 550 may obtain information on the position of the arm or the hand via a camera 560 or position sensor 506, and adjust a moving distance of the first operating device 514 or the second operating device 524 further based on the information. For example, the user arm position is higher relative to the storage container for easy grabbing of the item at a previously set use position, the first operating device 514 or the second operating device 524 may further lift the first storage container 510 or the second storage container 520, respectively. Once the user returns the item to the first storage container 510 or the second storage container 520, at the step 780, the method 700 may lower the first or the second storage container 510, 520 to the stowed position based on the voice signal. For example, the voice signal may be "stow the cup" or other messages understood by the user.

Further, in other embodiments, for instance referring to FIG. 5, the first and second storage containers 510, 520 may be remained at the stowed position based on the safety consideration. Before or during the operation of lowering the storage containers, a voice message may be played to inform the user about the operation. When an alert is issued prior to the operation, the user is given time to return the item to the storage container. The method 700 ends at step 790 or method may proceed to the step of detecting user intent again.

As described in the specification, one or more embodiments of the present disclosure provide operating systems and operating methods for moving a storage device. The storage device may include two storage containers and two separate operating devices connected to the storage containers. In some embodiments, a user intent to take an item from the storage container may be determined by a speech recognition device, and the controller may control the operating device based on the signal from the speech recognition device. For example, the storage container may be raised to a use position that is easy for the user to take the item, such as raised to a height for a user to take an item easily. In some embodiments, the controller may further control the operating device to adjust or modify the use position (e.g., the height of the storage container) based on the information from a position determination device, thereby placing the storage container to a position suiting for different users or different usage preferences. In some embodiments, to the operation to move the storage containers is further controlled based on the vehicle environment, road conditions, and information related to driving safety. In this way, the operation to move the storage containers can be performed at the conditions of safe driving. Those who skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An operating system for a vehicle storage device, wherein the vehicle storage device includes a first storage container and a second storage container, the operating system comprising:
a first operating device connected to the first storage container;
a second operating device connected to the second storage container;
a user intent detecting device to detect an intent of a user to take an item from one of the first and second storage containers;
a position determination device, wherein the position determination device is a camera located at a vehicle ceiling or adjacent an instrument panel and configured to capture an image of an arm or a hand of the user in a vicinity of the first storage container or the second storage container;
a vehicle distance sensor to obtain information on a distance from the vehicle to another vehicle; and
a controller, wherein the controller is configured to receive an intent signal from the user intent detecting device and receive a signal from the position determination device, determine a relative position of the hand or the arm of the user to the first or second storage container and control one of the first and second operating devices based on the intent signal and the relative position to move the first or second storage container to a use position that is easier for the user to take the item compared to a stowed position; wherein the controller is further configured to control an operation of the first and second operating devices based on the distance and restrict movement of the first and second operating devices when the distance is smaller than a threshold; wherein the controller is further configured to determine a driving condition and issue an alert to the user informing a current driving condition when the current driving condition prohibits a movement of the first and second storage containers and wherein the alert is issued as a voice message or a text message displayed on a human machine interface of the vehicle.

2. The operating system of claim 1, wherein the user intent detecting device includes a speech recognition device configured to obtain and recognize instruction from the user to take an item from the first storage container or second storage container, wherein the use position is a position where the first storage container or the second storage container is at a height higher than the stowed position.

3. The operating system of claim 1, wherein each of the first and second operating devices includes a retractable assembly and a driving device connected to the retractable assembly, and wherein the retractable assembly is able to extend and retract and configured to move the first and second storage containers along a vehicle height direction.

4. The operating system of claim 1, further comprising a speed sensor and a steering sensor, wherein the controller is further configured to receive a speed signal from the speed sensor and a steering signal from the steering sensor, and the first and second operating devices are restricted from operation when the speed signal and the steering signal indicate that it is not safe to operate a steering wheel with one hand off the steering wheel.

5. The operating system of claim 1, wherein the user intent detecting device comprises a proximity sensor, wherein the proximity sensor is configured to obtain a signal when a user hand approaches or contacts the first or second storage container and the controller is configured to determine that the user intends to take the item based on the signal from the proximity sensor.

6. An operating method for a storage device of a vehicle, the storage device including a first storage container and a second storage container, a first operating device connected to the first storage container, and a second operating device connected to the second storage container, the method comprising:
- detecting an intent of a user to take an item from the storage device;
- detecting a relative position of a hand or an arm of the user to the first storage container or the second storage container via a camera configured to capture an image of the hand or the arm of the user in a vicinity of the first storage container or the second storage container;
- determining a use position based on the relative position;
- determining a driving condition;
- moving the first operating device or the second operating device to place the first or the second storage container to the use position at which it is easy for the user to take the item compared to a stowed position when it is determined that the user intends to take the item; and
- issuing an alert to the user informing a current driving condition when the current driving condition prohibits a movement of the first and second storage containers;
- wherein the alert is issued as a voice message.

7. The operating method of claim 6, wherein detecting the intent of the user includes receiving a voice command from a speech recognition device.

8. The operating method of claim 7, further comprising modifying the use position based on the relative position of the arm or the hand of the user relative to the first storage container or the second storage container.

9. The operating method of claim 6, further comprising detecting a vehicle speed, a steering status and a distance between the vehicle and another vehicle and controlling the first operating device or the second operating device based on information on the vehicle speed, the steering status and the distance.

10. The operating method of claim 6, further comprising returning the first or second storage container to the stowed position after the item is placed back in the first or second storage container.

11. The operating method of claim 10, wherein returning the first or second storage container to the stowed position is performed based on a voice command of a speech recognition device.

12. The operating method of claim 6, wherein each of the first and second storage container includes a weight sensor, and the method further comprising: returning the first storage container or the second storage container to the stowed position upon detection of an increased weight in the first or second storage container after completion of moving the first or the second storage container to the use position.

13. An operating system in a vehicle, comprising:
- a first storage container;
- a second storage container;
- a speech recognition device to detect an intent of a user to take an item from the first or second storage container;
- a camera to obtain information on a position of an arm or a hand of the user relative to the first or second storage containers;
- a first operating device and a second operating device drivably connected to the first and second storage containers, respectively; and
- a controller configured to determine the intent of the user based on a signal from the speech recognition device, determine a use position based on information from the camera and control one of the first and second operating devices to selectively raise one of the first and second storage containers to the use position closer to the user than a stowed position;
- wherein the controller is further configured to determine a driving condition and issue an alert to the user informing a current driving condition when the current driving condition prohibits a movement of the first and second storage containers, and wherein the alert is issued as a voice message.

14. The operating system of claim 13, wherein the controller is further configured to receive information related to a safe driving and control the first operating device or second operating device based on the information related to the safe driving, and wherein while a safety measure is activated, the first storage container or the second storage container is returned to or retained at the stowed position when the information related to the safe driving indicates that it is not safe to operate the first and second operating devices.

* * * * *